United States Patent [19]
Milbourn et al.

[11] Patent Number: 5,794,673
[45] Date of Patent: Aug. 18, 1998

[54] STUMP GRINDER

[75] Inventors: David E. Milbourn, 54 Milbourn La., Hoquiam, Wash. 98550; Richard W. Goldy, Montesano, Wash.

[73] Assignee: David E. Milbourn, Hoquiam, Wash.

[21] Appl. No.: 720,536

[22] Filed: Sep. 30, 1996

[51] Int. Cl.$^6$ ................................ A01G 23/06
[52] U.S. Cl. .............. 144/24.12; 144/334; 144/218; 37/302; 241/101.74
[58] Field of Search ............ 37/302; 241/101.74; 144/24.12, 334, 218, 219

[56] References Cited

U.S. PATENT DOCUMENTS

| | | | |
|---|---|---|---|
| 4,271,879 | 6/1981 | Shivers, Jr. et al. | 144/24.12 |
| 4,530,385 | 7/1985 | York | 144/24.12 |
| 4,615,121 | 10/1986 | Hakansson | 30/371 |
| 4,769,977 | 9/1988 | Milbourn | 56/15.2 |
| 4,848,423 | 7/1989 | Yoder | 144/24.12 |
| 5,090,287 | 2/1992 | Chezem | 83/838 |
| 5,158,126 | 10/1992 | Lang | 144/24.12 |
| 5,303,471 | 4/1994 | Liberatoscioli | 30/122 |
| 5,329,752 | 7/1994 | Milbourn | 56/16.4 |
| 5,355,918 | 10/1994 | Lang | 144/24.12 |
| 5,408,814 | 4/1995 | Milbourn | 56/15.2 |
| 5,445,561 | 8/1995 | Elmer | 452/133 |

Primary Examiner—W. Donald Bray
Attorney, Agent, or Firm—Joan H. Pauly

[57] ABSTRACT

A cutting head (20) is mounted on the outer end of a boom structure of a self-propelled machine, such as an excavator. The cutting head housing has a vertically oriented rotary cutter wheel (48) mounted on a side portion thereof. Side and top portions of the wheel (48) are protected by a shroud (56), which has generally conical side members (72, 80). The members (72, 80) strengthen the shroud (56), provide cutting depth control, and assist the operator in positioning the cutter wheel (48) on a stump. The wheel (48) and shroud (56) are laterally offset from a rearward projection (88) of the housing. A double heel rack (92, 94) is formed on the free outer end of the projection (88). The upper leg (92) of the rack cooperates with a thumb (28) to grip objects. The lower leg is used for stabilizing the vehicle. The rack (92, 94) also functions as a rake.

19 Claims, 5 Drawing Sheets

STUMP GRINDER

TECHNICAL FIELD

This invention relates to stump grinders and, more particularly, to a stump grinder that is attachable to the boom structure of a self-propelled machine, that has a rear double heel rack with an upper leg for gripping objects in cooperation with a thumb and a lower leg for engaging the ground to stabilize the machine, and that has a vertical cutter wheel with a shroud having conical side members to strengthen the shroud, limit cutting depth, and assist the operator in positioning the cutter wheel.

BACKGROUND INFORMATION

In land clearing operations, there is frequently a need to remove stumps after trees have been cut. The currently available stump grinders for accomplishing this task have serious limitations. A major limitation is that the stump grinders have no or inadequate cutting depth control and, thus, are subject to jamming and stalling of the cutter wheel. When the cutter wheel stalls or jams, the stump removal operation is interrupted, thereby adding to the time and expense involved in the procedure. In addition, damage to the cutter wheel and other portions of the stump grinder can occur. Other limitations of current stump grinders include lack of ease of operation and lack of versatility.

Stump removal devices are disclosed in U.S. Pat. Nos. 4,271,879, granted Jun. 9, 1981, to N. E. Shivers, Jr. et al.; 4,530,385, granted Jul. 23, 1985, to N. N. York; 4,848,423, granted Jul. 18, 1989, to A. J. Yoder; 5,158,126, granted Oct. 27, 1992, to W. J. Lang; and 5,355,918, granted Oct. 18, 1994, to W. J. Lang.

SUMMARY OF THE INVENTION

The present invention is directed toward a cutting head for a self-propelled machine or vehicle of a type including an articulated boom structure.

According to an aspect of the invention, the cutting head is intended for a machine having a thumb pivotally attached to an outer end portion of the boom structure. The cutting head comprises a housing pivotally attachable to the outer end portion of the boom structure. The housing includes a rear portion having a rearward free end and a double heel rack extending transversely across the rearward free end. The rack is substantially L-shaped in cross section and has an upper leg and a lower leg. The upper leg is positioned to oppose a free outer end portion of the thumb to cooperate with the thumb to grip objects therebetween. The lower leg is positioned and configured to dig into a ground surface when the cutting head is pivoted to tilt the rear portion downwardly, to aid in stabilizing the machine when the machine is moving along sloped ground surfaces.

A feature of the invention is a rearwardly extending projection that forms the rear portion of the housing, and a vertically oriented rotary cutter wheel rotatably mounted on a forward side portion of the housing and laterally offset from the projection. Another feature of the invention is a protective shroud surrounding top and side portions of the cutter wheel and having a lower opening to expose a peripheral portion of the cutter wheel for cutting stumps. The housing has a horizontal position in which the lower opening faces downwardly to enable cutting along a horizontal top surface of a stump. In this position, the lower leg of the rack is oriented relative to the top surface of the stump at an angle of about 45°.

According to another aspect of the invention, the cutting head described above is provided in combination with a self-propelled vehicle including a base, an articulated boom structure, and a thumb. The boom structure has a plurality of pivotally connected boom components including a rear boom component and a forward boom component. The inner end of the rear boom component is attached to the base. The housing of the cutting head component is pivotally attached to the outer end of the forward boom component. The thumb is pivotally attached to one of the components to pivot relative to the housing. Preferably, the thumb and housing are mounted to pivot about a common horizontal axis. Also preferably, the rear portion of the housing comprises a rearwardly extending projection positioned below the axis and projecting rearwardly relative to the axis.

According to still another aspect of the invention, the cutting head for a vehicle of a type including an articulated boom structure comprises a housing, a vertically oriented rotary cutter wheel, a protective shroud, and a side member. The housing is pivotally attachable to an outer end portion of the boom structure. The cutter wheel is rotatably mounted on the housing. The shroud is carried by the housing and surrounds top and side portions of the cutter wheel. It has first and second opposite sidewalls positioned adjacent to opposite faces of the cutter wheel. A lower opening in the shroud exposes a peripheral portion of the cutter wheel. The side member has an inner portion and an outer portion. The inner portion is cylindrical and has an inner radial end secured to the first sidewall of the shroud. The outer portion is at least frustoconical and has a base circumferentially coextensive with the cylindrical inner portion and tapering radially inwardly and axially outwardly from the inner portion. The outer portion is substantially coaxial with the cutter wheel. The side member serves to strengthen the shroud, control cutting depth to prevent jamming of the cutter wheel, and assist an operator of the vehicle in positioning the peripheral portion of the cutter wheel on a top surface of a stump to enable cutting along the top surface to grind the stump.

As used herein, the phrase "at least frustoconical" is intended to mean the part of a cone shape next to the base formed by cutting off an apex portion of the shape by a plane parallel to the base, with the extent of the apex portion varying to zero. In other words, the phrase "at least frustoconical" is intended to include a complete conical shape as well as such a shape which has an apex portion of greater than zero extent cut therefrom.

Preferably, the shroud has an upper portion that extends radially beyond the side member, and a lower portion substantially radially coextensive with the side member. The upper portion encloses top and side portions of the cutter wheel adjacent thereto and has an open bottom, to direct wood chips and other debris downwardly.

The configurations of the housing and side member may be varied. Preferably, the housing includes a mounting portion positioned to be pivotally attachable to the outer end portion of the boom structure, and the shroud is carried by a side portion of the housing and is laterally offset from the mounting portion. The second sidewall of the shroud is adjacent to the side portion of the housing. The outer portion of the side member comprises a complete cone. The cutting head also includes a second side member extending from the second shroud sidewall and under the side portion of the housing. The second side member is substantially a mirror image of a lower portion of the side member that is secured to the first sidewall.

Preferably, the housing includes a rear portion having a rearward free end, and a rack extending transversely across the rearward free end. The rack is positioned to oppose a thumb pivotally attached to the mounting portion, to cooperate with the thumb to grip objects therebetween. The rack preferably has the characteristics described above.

The stump grinder of the invention has a number of advantages. It is durable, reliable, and relatively easy to operate. It is also highly versatile and enables a single operator to grind stumps in the ground, stumps that have been removed from the ground, and, if necessary, cut logs without leaving the cab of the vehicle. In addition, the rack feature of the invention allows the same operator to remove logs and other debris to improve access to a stump for grinding the stump. The removal can be accomplished by gripping and lifting the debris or by raking the debris. The stabilizing action of the lower leg of the rack increases the mobility of the vehicle. Thus, a single member that is simple in construction, the double heel rack, provides a plurality of functions to assist in the grinding operation. Similarly, the side member feature of the shroud has a plurality of functions. As described above, the side member or members serve to strengthen the shroud, control cutting depth, and assist the operator in positioning the cutter wheel. All of these functions in turn increase the reliability and efficiency of the operation of the stump grinder.

These and other advantages and features will become apparent from the detailed description of the Best Mode for Carrying out the Invention that follows.

BRIEF DESCRIPTION OF THE DRAWINGS

In the drawings, like element designations refer to like parts throughout, and:

FIG. 7 is a pictorial view of the cutting head and thumb shown in FIGS. 1 and 2 shown with the thumb and rake tilted downwardly.

BEST MODE FOR CARRYING OUT THE INVENTION

Figure 1:
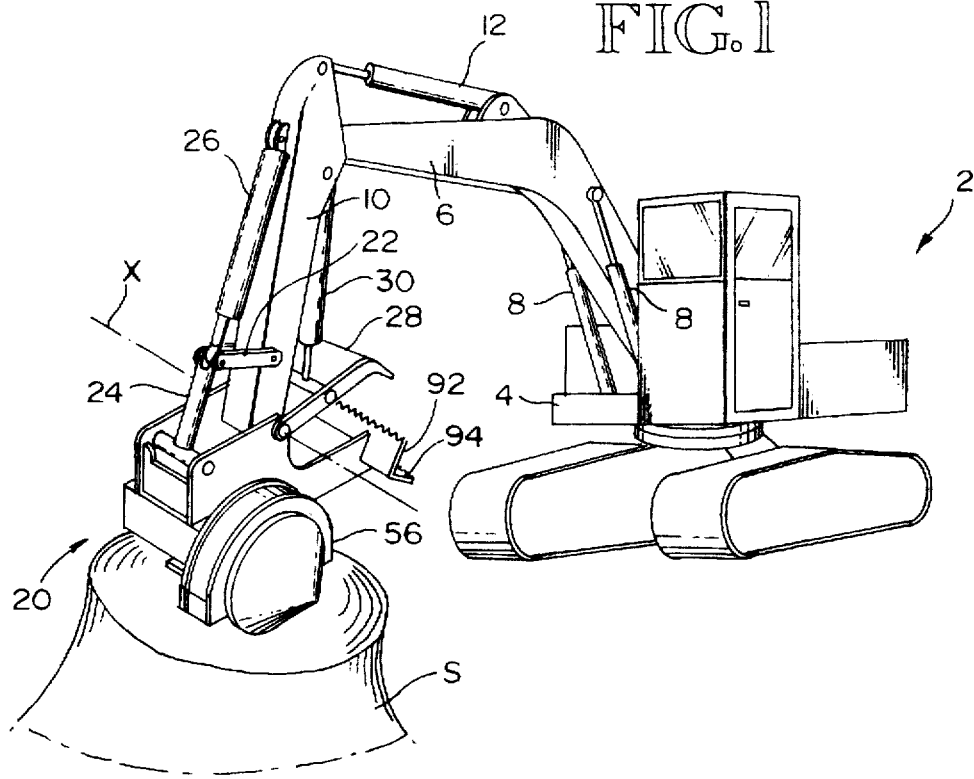
FIG. 1 is a pictorial view of the preferred embodiment of the invention being used to grind along the top surface of a stump.

The drawings show a stump grinder that is constructed according to the invention and that constitutes the best mode for carrying out the invention currently known to the applicant. In the drawings, the cutter head 20 of the stump grinder is shown mounted on an excavator of a known type. It is anticipated that a primary use of the cutter head 20 will be in connection with the type of self-propelled excavator shown in the drawings. However, it is intended to be understood that the cutter head may also be mounted advantageously on other types of machines, including other types of excavators and backhoes. Whatever type of machine is used, it preferably has its own hydraulic system for powering the relative pivoting of the boom components and the cutter head 20 and also for powering a motor to rotate the cutter wheel.

Referring to FIG. 1, the excavator includes a tractor-type vehicle 2 having a base 4. The inner end of a rear boom 6 is pivotally mounted on the base 4. A pair of hydraulic cylinders 8 are provided for pivoting the boom 6 relative to the base 4. The inner end of a second boom 10 is pivotally attached to the outer end of the first boom 6. A hydraulic cylinder 12 is mounted on the first boom 6 and engages the second boom 10 to pivot the second boom 10 relative to the first boom 6.

Figure 2:
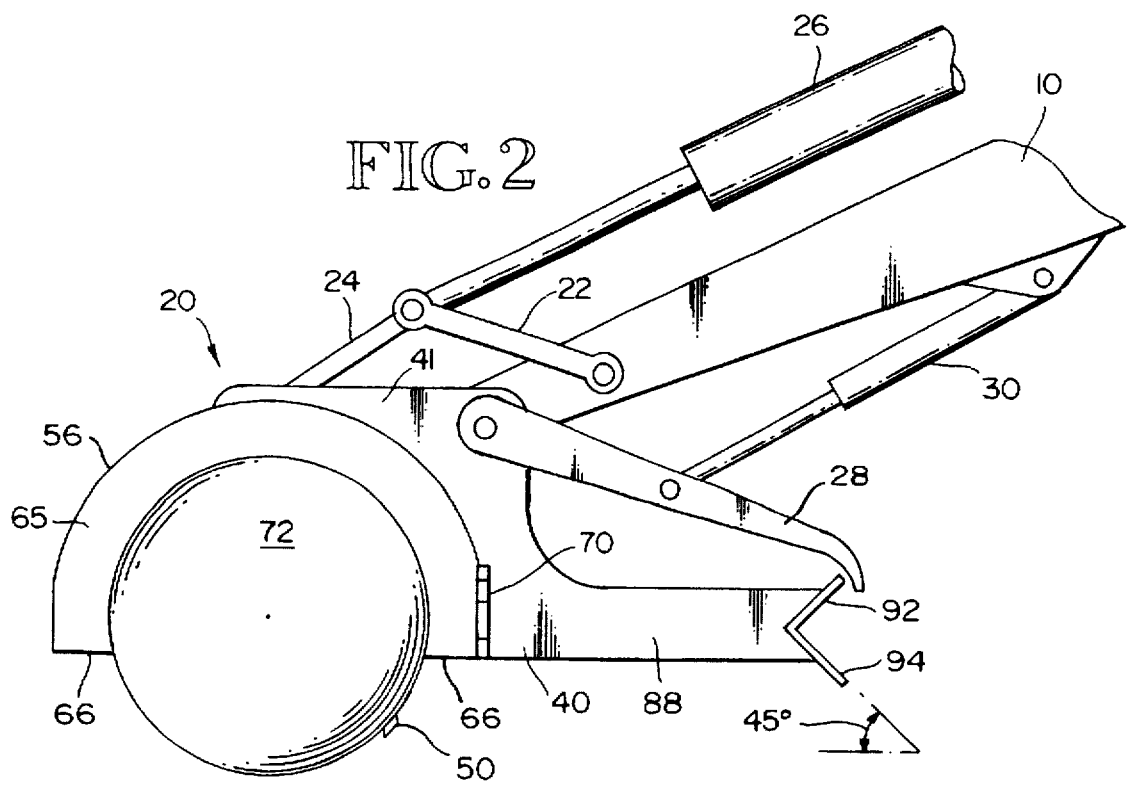
FIG. 2 is a side elevational view of the cutting head and lower portions of the boom structure shown in FIG. 1.
Figure 3:
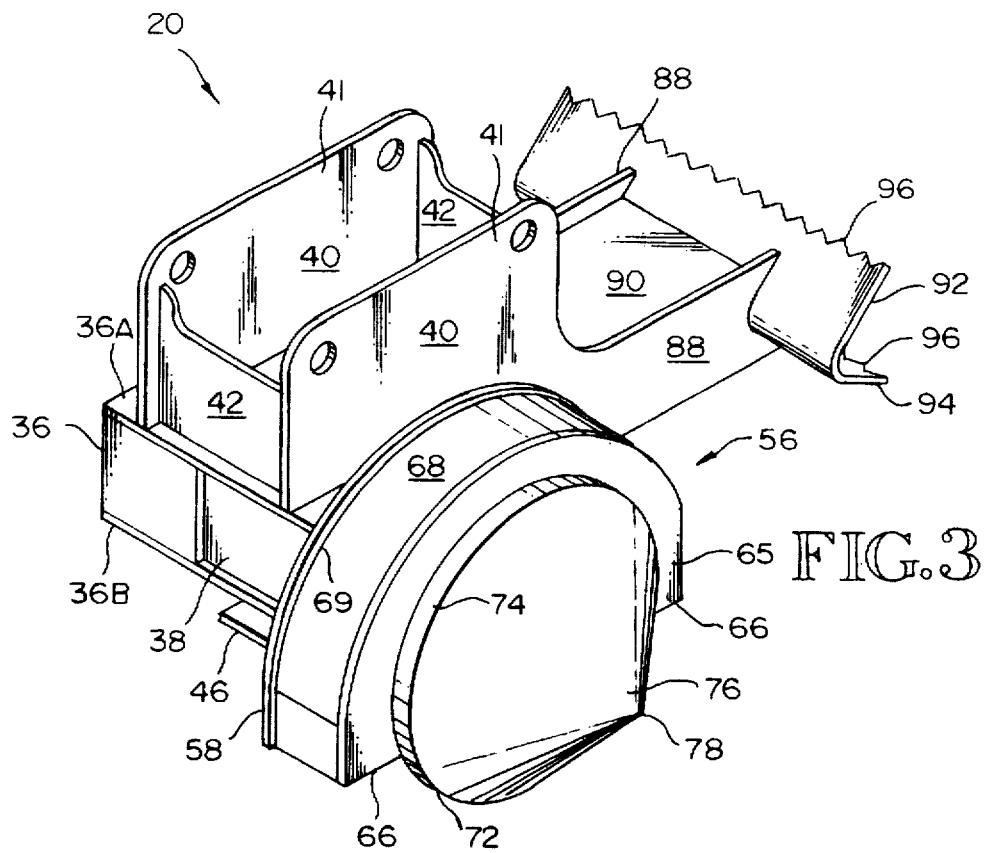
FIG. 3 is a pictorial view of the cutting head shown in FIGS. 1 and 2.

Referring to FIGS. 1 and 2, the cutter head 20 is pivotally mounted on the outer end of the second boom 10 to pivot about a horizontal axis X. The head 20 is also connected to the boom 10 by means of linkage 22, 24 that includes a first link 22 having one end pivotally attached to the boom 10 and its opposite end pivotally attached to a second link 24. The other end of the link 24 is pivotally attached to the cutter head 20 forwardly of the axis X. A hydraulic cylinder 26 engages the ends of the links 22, 24, that are connected to each other and is operated to pivot the cutter head 20 relative to the boom 10 about the axis X. A thumb 28 is also mounted on the cutter head 20 for pivotal movement relative to the head 20 about the axis X. The pivot pin that defines the axis X extends through the thumb 28, a mounting portion of the cutter head 20, and the boom 10. A hydraulic cylinder 30 carried by the boom 10 engages the thumb 28 to pivot the thumb 28 relative to the head 20. The free outer end of the thumb 28 has teeth 32 for gripping debris, as described below and illustrated in FIG. 7. The portions of the excavator described above, including the vehicle 2, booms 6, 10, hydraulic cylinders 8, 12, 26, 30 and thumb 28, but excluding the cutter head 20, are known structures of known types of excavators.

Referring to FIGS. 1–6, the cutter head 20 has a housing including a bearing assembly mount 36, which carries a bearing housing 38, and a pair of laterally spaced-apart mount plates 40. As shown in FIGS. 3–7, the bearing assembly mount 36 includes a top plate 36A, a bottom plate 36B, a side plate 36C, and an end plate 36D. The upper portion of the forward half of each mount plate 40 forms a mounting portion 41. The mounting portions 41 of the two plates 40 together form the mounting portion of the housing, to which the outer end of the second boom 10, the thumb 28, and the link 24 are pivotally attached. Front and rear gussets 42 extend between and connect the mount plates 40. A front opening 44 (FIGS. 5 and 6) is formed in the lower half of the two mount plates 40 and the forward gusset 42 for receiving the bearing assembly mount 36. The bearing assembly mount 36 is welded to the plates 40 and forward gusset 42 to secure these housing portions together. The connection is reinforced by a bottom plate 46. Additional bracing members, such as the brace 47 shown in FIG. 7, may be provided between the bearing assembly mount 36, the mount plates 40, and the shroud 56, described below.

Figure 4:
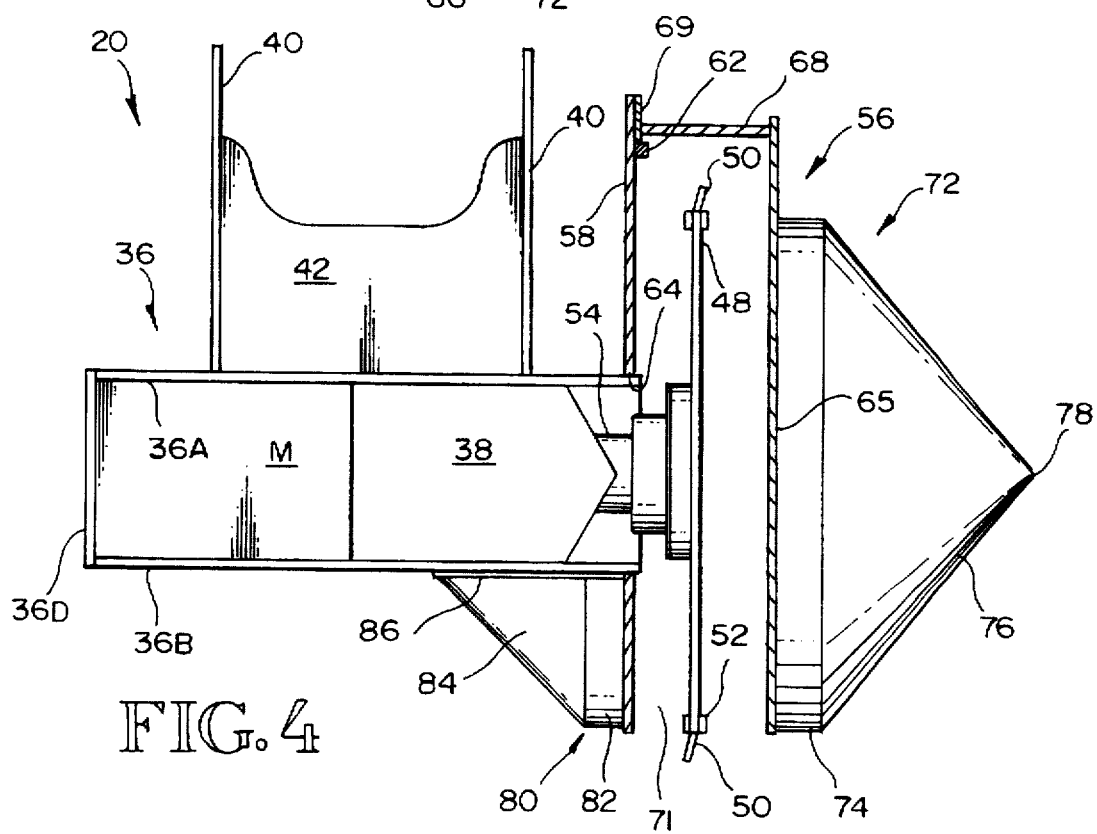
FIG. 4 is a front elevational view of the cutting head shown in FIG. 3, with the shroud shown in section.
Figure 5:
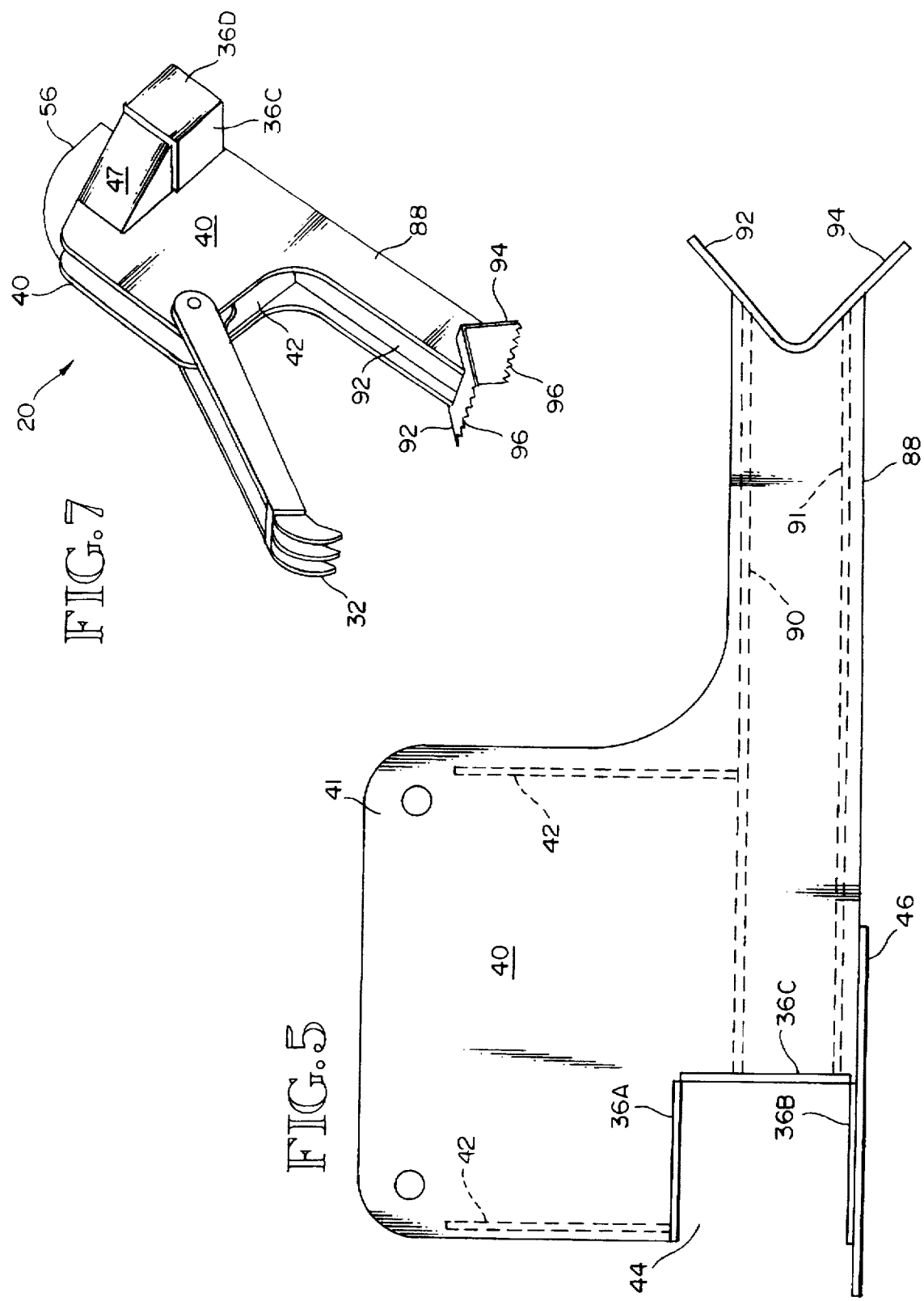
FIG. 5 is a side elevational view of one of the mount plates and other portions of the cutting head housing shown in FIGS. 1–4.

A vertically oriented rotary cutter wheel 48 is rotatably mounted on the cutter head housing. The wheel 48 has two radial cutter teeth 50 mounted on diametrically opposite peripheral portions thereof. Each tooth 50 is connected to the disk body of the cutter wheel 48 by a pocket 52, described below. The motor M for the wheel 48 is mounted in the bearing assembly mount 36, as shown in FIG. 4. A shaft 54 connects the wheel 48 to the motor M through the bearing housing 38. The bearing housing is preferably of the type disclosed in my U.S. Pat. No. 4,769,977, granted Sep. 13, 1988.

Figure 6:
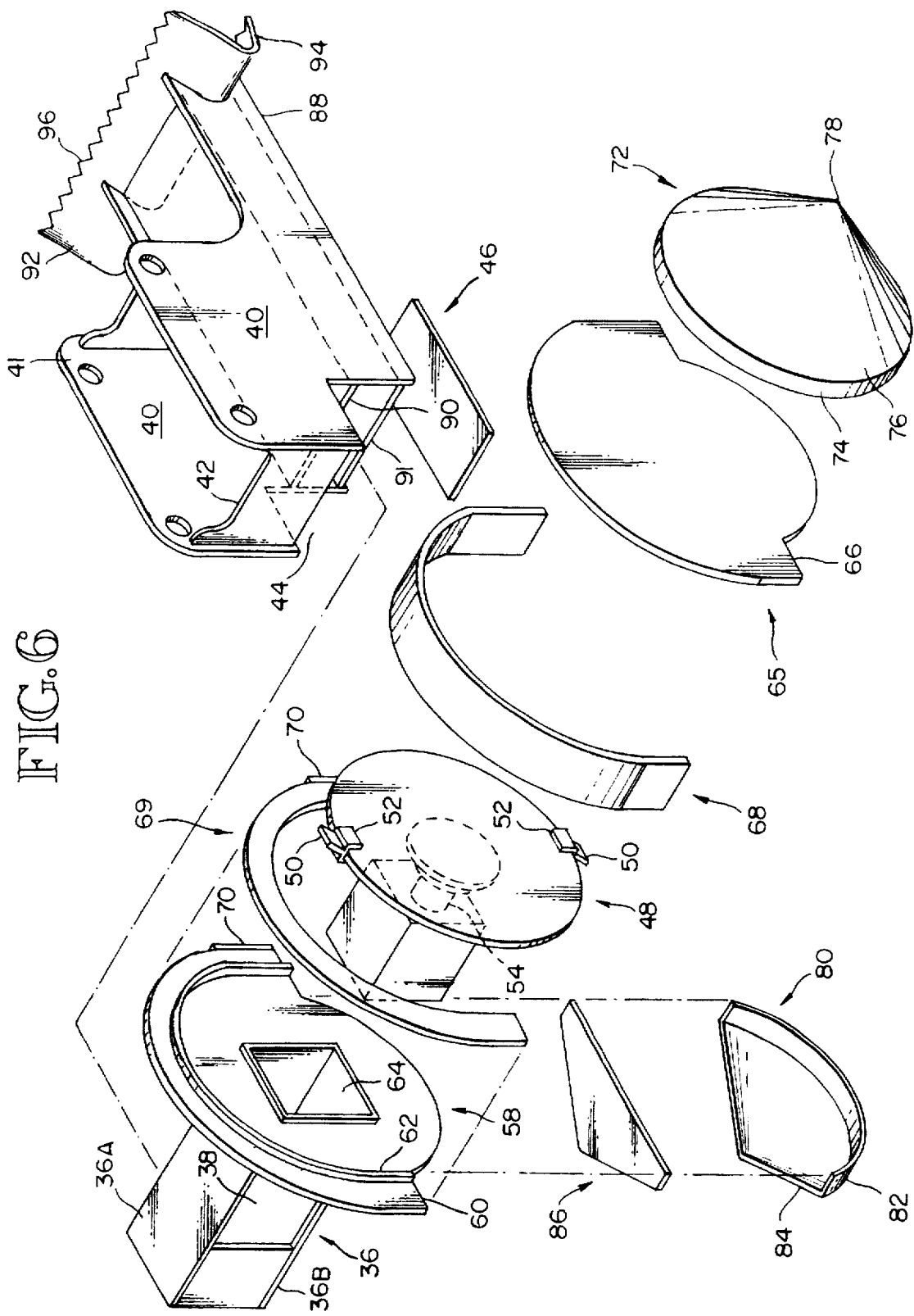
FIG. 6 is an exploded pictorial view of the cutting head shown in FIGS. 3 and 4.

A protective shroud 56 is carried by the housing and surrounds top and side portions of the cutter wheel 48. Referring to FIGS. 4 and 6, the shroud 56 includes a back plate 58 having an enlarged upper portion and a reduced diameter lower portion with opposite chordal shoulders 60 defining the lower end of the upper portion adjacent to the reduced diameter lower portion. A curved reinforcing rib 62 extends around the inner surface of the back plate 58 and has opposite ends terminating at the inner ends of the chordal shoulders 60. Along its curved length, the rib 62 is spaced inwardly from the outer edge of the plate 58 a constant distance. A square center opening 64 is formed in the plate 58 for receiving the end of the bearing assembly mount 36.

The shroud 56 also includes a front plate 65 having chordal shoulders 66 positioned in the same manner as the shoulders 60 on the back plate 58. An edge of an arch-shaped cover 68 is secured to a perimeter portion of the enlarged upper portion of the front plate 65. A radial bolt flange 69 is secured to the edge of the cover 68 opposite the front plate 65. The bolt flange 69 is hingedly connected to a perimeter portion of the enlarged upper portion of the back plate 58 by a hinge 70. A plurality of bolts (not shown) extend through the flange 69 and back plate 58 to releasably secure the flange 69 and plate 58 together. For maintenance purposes, the bolts may be removed and the front plate 65, cover 68, and bolt flange 69 pivoted away from the back plate 58 and cutter wheel 48 to gain access to the wheel 48. Since the cover 68 extends around only the enlarged upper portion of the shroud 56, a lower opening 71 is formed in the shroud 56 between the back and front plates 58, 65. This opening 71 exposes a peripheral portion of the cutter wheel 48 to enable the wheel to grind stumps. In the preferred embodiment, the exposed peripheral portions consist of the radially projecting teeth 50. In the usual grinding position of the cutter head shown in FIGS. 1-4, the opening 71 faces downwardly. The upper portion of the shroud 56, including the enlarged upper portions of the front and back plates 65, 58 and the cover 68, encloses top and side portions of the wheel 48 adjacent thereto, and has an open bottom. This forms an enclosed arcuate passageway around the upper portion of the wheel 48 having opposite ends defined by the chordal shoulders 60, 66. During a grinding operation, wood chips and other debris are directed downwardly through the passageway.

The shroud 56 is provided with first and second side members 72, 80. The first side member 72 has a cylindrical inner portion 74 with an inner radial end that is secured by welding to the shroud sidewall formed by the front plate 65. The reduced diameter lower portion of the plate 65 is substantially radially coextensive with the member 72. The member 72 also has a conical outer portion 76 with a base that is circumferentially coextensive with the cylindrical inner portion 74. The conical portion 76 tapers radially inwardly and axially outwardly from the cylindrical inner portion 74 to an apex 78. The outer portion 76 is substantially coaxial with the cutter wheel 48.

The shroud 56 is carried by a side portion of the cutter head housing. In the preferred embodiment, this side portion is the adjacent end of the bearing assembly mount 36. The positioning of the shroud 56 on the end of the mount 36 results in the shroud 56 being laterally offset from the mounting portion 41 of the housing.

The second side member 80 is essentially a mirror image of the lower approximately thirty percent of the first side member 72. It includes an inner portion 82 that is a segment of a cylinder and an outer portion 84 that is a segment of a cone. The second side member 80 is welded to the sidewall of the shroud 56 formed by the backplate 58 and to a cone mount plate 86, which is, in turn, welded to the bottom of the bearing assembly mount 36 and the backplate 58. Thus, the second side member 80 extends under and is secured to the bearing assembly mount 36, which carries the shroud 56.

The two side members 72, 80 perform several functions. First, the side members 72, 80 strengthen the shroud 56 and its connection to the bearing assembly mount 36. Second, the inner cylindrical portions 74, 82 serve to limit the cutting depth of the cutter wheel 48. The limiting of the cutting depth helps prevent stalling and jamming of the cutter wheel 48 and damage to the cutter wheel 48. The conical outer portions 76, 84 assist in the depth control function by preventing the cutter wheel 48 from cutting a wide groove with steep edges and requiring a trough cut to either be substantially wider than the distance between the opposite edges of the cylindrical portions 74, 82 or have sloped sides. An additional function of the side members 72, 80 is the assistance they provide to the operator of the stump grinder in locating the exposed portion of the cutter wheel 48 on a top surface of a stump to be ground. The side members 72, 80 also take side forces to protect the cutter wheel 48 and enable cutting action in which the cutter head 20 is moved sideways along the top of a stump.

In a typical grinding operation, the cutter wheel 48 is moved back and forth along the top surface of a stump S, as illustrated in FIG. 1 to grind down the stump S. When the operator is moving the cutter head 20 toward the stump S to begin or resume the grinding operation, it is difficult for the operator to accurately locate the cutter head 20 by visual means only. The side members 72, 80 provide additional input to supplement the operator's visual observations. When the operator moves the cutter head 20 toward the stump S, one of the side members 72, 80, and particularly the first side member 72, is most likely to first come into contact with the edge of the stump S. When the operator feels this contact, he can ease up on the hydraulic controls and slowly move the cutter head up and over, allowing the conical surface 76, 84 to slide along the edge of the stump S to bring the exposed portion of the cutter wheel 48 in vertical alignment with the top surface of the stump S. The operator then moves the cutter wheel back and forth along the top of the stump S to grind the stump S. In this manner, the stump grinder can grind a stump of virtually any size to a depth below ground limited only by the machine on which the cutter head 20 is mounted.

Additional functions of the cutter head 20 are provided by a rearwardly extending projection on the housing. The rearwardly extending projection is formed by a rearward projection 88 on each of the mount plates 40 and is positioned below and projects rearwardly relative to the axis X. A top plate 90 and a corresponding bottom plate 91 extend between the mount plates 40, including their rearward projections, to form a rigid member that carries at its rearward free end a double heel rack 92, 94. The rack 92, 94 extends transversely across the rearward free end of the projection and laterally beyond each of the mount plates 40 a short distance of about, for example, six inches. The rack 92, 94 is L-shaped in cross section and has an upper leg 92 and a lower leg 94 which meet at an angle of substantially 90°. The outer edge of each leg 92, 94 has a plurality of teeth 96 formed thereon. When the cutter head housing is in the horizontal position illustrated in FIGS. 1–4, the lower leg 94 of the rack is oriented relative to the ground or a horizontal top surface of a stump S at an angle of about 45°. The rearward projection, and thus the rack 92, 94, are rearwardly and laterally offset from the cutter wheel 48.

The cylinder 26 may be operated to pivot the cutter head 20 and tilt the rearward projection 88 downwardly, as shown in FIG. 7. In this position of the cutting head 20, the positioning and configuration of the lower leg 94 allows the lower leg 94 to dig into the ground surface to aid in stabilizing the vehicle 2 when the vehicle 2 is moving along sloped ground surfaces. The upper leg 92 is positioned to oppose the free outer end of the thumb 28 to cooperate with the thumb 28 to grip objects therebetween. This enables an operator in the cab of the vehicle 2 to lift and remove logs and other debris away from a stump preparatory to grinding the stump. The operator may also use the rack 92, 94 as a rake to clear debris and smooth over ground surfaces before or after grinding a stump.

The tooth pocket 52 mentioned above is illustrated in FIGS. 8–10. The pocket 52 removably receives a tooth 50 and is welded to the disk of the cutter wheel 48. As the tooth becomes worn, it can for a time be sharpened. After a number of sharpenings, the wear on the tooth is too extensive for sharpening, and the tooth 50 must be replaced. The tooth pocket 52 allows this to be accomplished quickly and easily.

Figure 8:
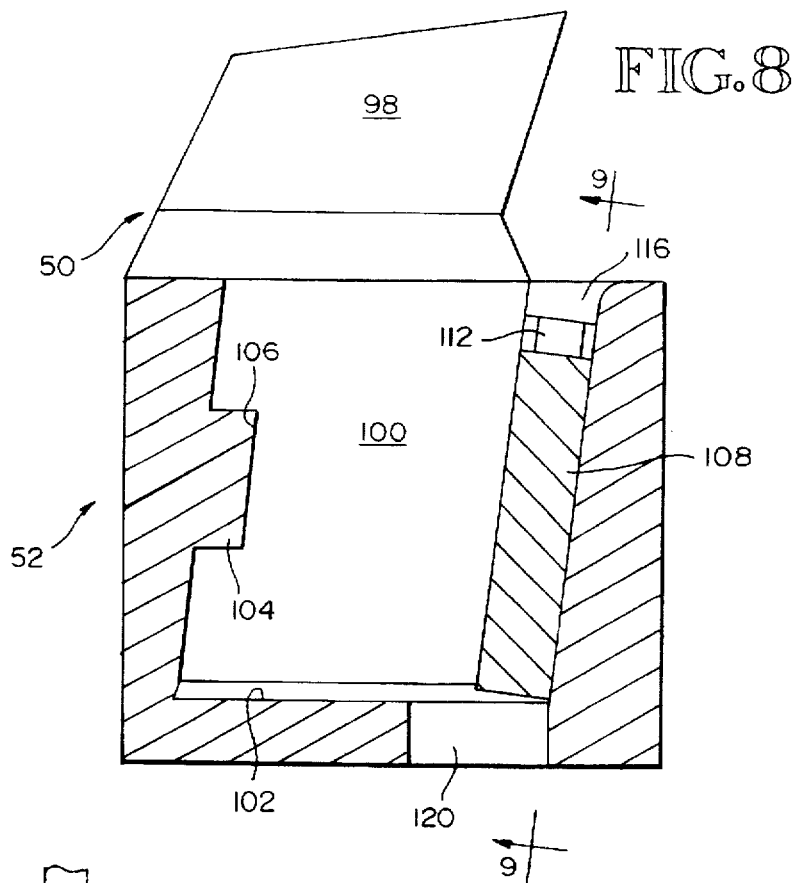
FIG. 8 is a sectional view of one of the tooth pockets with a tooth installed therein, showing the tooth in elevation.
Figure 9:
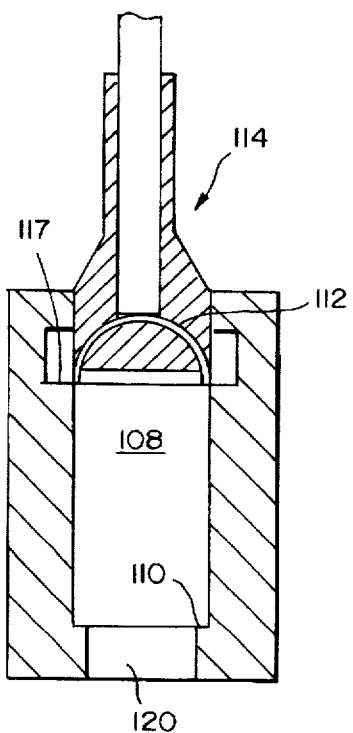
FIG. 9 is a sectional view taken along the line 9—9 of FIG. 8 but with the retainer in an unflattened condition and an installation punch in position to flatten the retainer.
Figure 10:
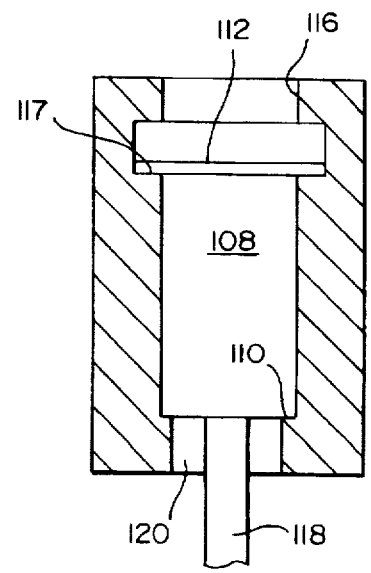
FIG. 10 is like FIG. 9 except that it shows the retainer flattened, the installation punch removed, and a removal punch in position.

Referring to FIGS. 8–10, the tooth 50 has an outer cutting portion 98 and a base portion 100. The base portion 100 is received into a tooth receiving cavity 102 in the pocket 52. The cutting portion 98 of the tooth 50 projects radially outwardly from the cavity 102, as can be seen in FIG. 8. The pocket 52 has a projection 104 that extends into the cavity 102. The base 100 of the tooth 50 has a corresponding notch 106 that receives the projection 104. The tooth 50 is omitted from FIGS. 9 and 10 to simplify illustration of the installation and removal procedures.

In the installation of the tooth 50, the tooth base 100 is inserted into the cavity 102 and moved to the left (as shown in FIG. 8). This brings the notch 106 into engagement with the projection 104. Then a spacer 108 is inserted to the right of the tooth base 100 and bottomed out on a shoulder 110, shown in FIGS. 9 and 10. A retainer 112 holds the spacer 108 in position. The retainer 112 initially has the arcuate configuration shown in FIG. 9. It is placed in the cavity 102 above the spacer 108 through the upper opening 116 above the spacer 108 and adjacent to the tooth 50. As shown in FIG. 9, an installation punch 114 is then used to engage the retainer 112. The punch 114 is impacted against the retainer 112 to flatten it into the configuration shown in FIG. 10. The flattened ends of the retainer 112 abut a shoulder 117 formed by an enlarged width portion of the cavity 102 to hold the retainer in a position in which it retains the spacer 108 in its installed position shown in FIGS. 8–10. When it comes time to replace the tooth 50, a removal punch 118 is inserted into the pocket 52 through a lower opening 120 that communicates with the cavity 102. The punch 118 is impacted against the spacer 108 to force it upwardly. The upward movement of the spacer 108 shears the retainer 117 to allow the spacer 108 to be moved upwardly all the way out of the pocket 52. Then, a new tooth 50 may be installed.

The cutter head of the invention is intended for use with any of a variety of current excavators. The design of the cutter head 20 allows easy adjustment to different excavators. Basically, all that is required is to vary the distance between the mount plates 40 to accommodate the width of the outer boom 10 of the excavator. The width of the gussets 42 and top and bottom plates 90, 91 are adjusted to the distance between the mount plates 40 to produce a rigid housing portion that receives the constant size bearing assembly mount 36.

As used herein, the terms "upper," "lower," "horizontal," "vertical," and the like refer to the use position shown in FIGS. 1–4.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A cutting head for a self-propelled machine of a type including an articulated boom structure, and a thumb pivotally attached to an outer end portion of the boom structure and having a free outer end portion, said cutting head comprising a housing pivotally attachable to said outer end portion of the boom structure; said housing including a rear portion having a rearward free end, and a double heel rack extending transversely across said rearward free end, said rack being substantially L-shaped in cross section and having an upper leg positioned to oppose said free outer end portion of said thumb to cooperate with said thumb to grip objects therebetween, and a lower leg positioned and configured to dig into a ground surface when the cutting head is pivoted to tilt said rear portion downwardly, to aid in stabilizing said machine when said machine is moving along sloped ground surfaces.

2. The cutting head of claim 1, in which said rear portion of said housing comprises a rearwardly extending projection, said cutting head including a vertically oriented rotary cutter wheel rotatably mounted on a forward side portion of said housing and laterally offset from said projection.

3. The cutting head of claim 2, which comprises a protective shroud surrounding top and side portions of said cutter wheel and having a lower opening to expose a peripheral portion of said cutter wheel for cutting stumps; said housing having a horizontal position in which said opening faces downwardly to enable cutting along a horizontal top surface of a stump, and said lower leg of said rack is oriented relative to said top surface at an angle of about 45°.

4. A cutting machine comprising:
   a self-propelled vehicle including a base;
   an articulated boom structure having a plurality of pivotally connected boom components including a rear boom component, and a forward boom component, each said forward and rear boom component having opposite inner and outer ends, and said inner end of said rear boom component being attached to said base;
   a cutting head component including a housing pivotally attached to said outer end of said forward boom component; and
   a thumb pivotally attached to one of said components to pivot relative to said housing, said thumb having a free outer end portion;
   said housing including a rear portion having a rearward free end, and a double heel rack extending transversely across said rearward free end, said rack being substantially L-shaped in cross section and having an upper leg positioned to oppose said free outer end portion of said thumb to cooperate with said thumb to grip objects therebetween, and a lower leg positioned and configured to dig into a ground surface when said cutting head component is pivoted to tilt said rear portion downwardly, to aid in stabilizing said vehicle when said vehicle is moving along sloped ground surfaces.

5. The cutting machine of claim 4, in which said thumb and said housing are mounted to pivot about a common horizontal axis.

6. The cutting machine of claim 5, in which said rear portion of said housing comprises a rearwardly extending projection positioned below said axis and projecting rearwardly relative to said axis.

7. The cutting machine of claim 6, which comprises a vertically oriented rotary cutter wheel rotatably mounted on a forward side portion of said housing and laterally offset from said projection.

8. The cutting machine of claim 4, in which said rear portion of said housing comprises a rearwardly extending projection, and which comprises a vertically oriented rotary cutter wheel rotatably mounted on a forward side portion of said housing and laterally offset from said projection.

9. The cutting machine of claim 8, in which said cutting head component comprises a protective shroud surrounding top and side portions of said cutter wheel and having a lower opening to expose a peripheral portion of said cutter wheel for cutting stumps; said housing having a horizontal position in which said opening faces downwardly to enable cutting along a horizontal top surface of a stump, and said lower leg of said rack is oriented relative to said top surface at an angle of about 45°.

10. A cutting head for a vehicle of a type including an articulated boom structure, said cutting head comprising:

a housing pivotally attachable to an outer end portion of the boom structure;

a vertically oriented rotary cutter wheel rotatably mounted on said housing;

a protective shroud carried by said housing and surrounding top and side portions of said cutter wheel; said shroud having first and second opposite sidewalls positioned adjacent to opposite faces of said cutter wheel, and a lower opening to expose a peripheral portion of said cutter wheel; and a side member having a cylindrical inner portion with an inner radial end secured to said first sidewall, and an at least frustoconical outer portion having a base circumferentially coextensive with said cylindrical inner portion and tapering radially inwardly and axially outwardly from said cylindrical inner portion, said at least frustoconical outer portion being substantially coaxial with said cutter wheel; said side member serving to strengthen said shroud, control cutting depth to prevent jamming of said cutter wheel, and assist an operator of the vehicle in positioning said peripheral portion of said cutter wheel on a top surface of a stump to enable cutting along said top surface to grind the stump.

11. The cutting head of claim 10, wherein said shroud has an upper portion that extends radially beyond said side member, and a lower portion substantially radially coextensive with said side member; said upper portion enclosing top and side portions of said cutter wheel adjacent thereto and having an open bottom, to direct wood chips and other debris downwardly.

12. The cutting head of claim 10, wherein said housing includes a mounting portion positioned to be pivotally attachable to said outer end portion of the boom structure, said shroud being carried by a side portion of said housing and laterally offset from said mounting portion, said second sidewall being adjacent to said side portion of said housing, and said at least frustoconical outer portion of said side member comprising a complete cone; and which comprises a second side member extending from said second sidewall and under said side portion of said housing, said second side member being substantially a mirror image of a lower portion of said side member secured to said first sidewall.

13. The cutting head of claim 12, wherein said housing includes a rear portion having a rearward free end, and a rack extending transversely across said rearward free end, said rack being positioned to oppose a thumb pivotally attached to said mounting portion, to cooperate with the thumb to grip objects therebetween.

14. The cutting head of claim 13, wherein said rack is substantially L-shaped in cross section and has an upper leg positioned to oppose the thumb, and a lower leg positioned and configured to dig into a ground surface when the cutting head is pivoted to tilt said rear portion downwardly, to aid in stabilizing said vehicle when said vehicle is moving along sloped ground surfaces.

15. The cutting head of claim 14, wherein said shroud has a lower opening to expose a peripheral portion of said cutter wheel for cutting stumps; said housing having a horizontal position in which said opening faces downwardly to enable cutting along a horizontal top surface of a stump, and said lower leg of said rack is oriented relative to said top surface at an angle of about 45°.

16. The cutting head of claim 12, wherein said shroud has an upper portion that extends radially beyond said side members, and a lower portion substantially radially coextensive with said side members; said upper portion enclosing top and side portions of said cutter wheel adjacent thereto and having an open bottom, to direct wood chips and other debris downwardly.

17. The cutting head of claim 10, wherein said housing includes a rear portion having a rearward free end, and a rack extending transversely across said rearward free end, said rack being positioned to oppose a thumb pivotally attached to said housing, to cooperate with the thumb to grip objects therebetween.

18. The cutting head of claim 17, wherein said rack is substantially L-shaped in cross section and has an upper leg positioned to oppose the thumb, and a lower leg positioned and configured to dig into a ground surface when the cutting head is pivoted to tilt said rear portion downwardly, to aid in stabilizing said vehicle when said vehicle is moving along sloped ground surfaces.

19. The cutting head of claim 18, wherein said shroud has a lower opening to expose a peripheral portion of said cutter wheel for cutting stumps; said housing having a horizontal position in which said opening faces downwardly to enable cutting along a horizontal top surface of a stump, and said lower leg of said rack is oriented relative to said top surface at an angle of about 45°.

* * * * *